(12) United States Patent
Nomura et al.

(10) Patent No.: US 7,465,873 B2
(45) Date of Patent: Dec. 16, 2008

(54) SOLAR CELL MODULE, METHOD OF LAYING SOLAR CELL MODULES, AND APPARATUS FOR PREVENTING SOLAR CELL MODULES FROM BEING BLOWN OFF

(75) Inventors: Takuji Nomura, Otsu (JP); Teruki Hatsukaiwa, Otsu (JP); Hirohiko Tomita, Kyoto (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/774,326

(22) Filed: Feb. 6, 2004

(65) Prior Publication Data

US 2005/0005534 A1    Jan. 13, 2005

Related U.S. Application Data

(63) Continuation of application No. PCT/JP02/05286, filed on May 30, 2002.

(30) Foreign Application Priority Data

Sep. 28, 2001 (JP) ............................... 2001-304642
Oct. 15, 2001 (JP) ............................... 2001-316847
Oct. 15, 2001 (JP) ............................... 2001-316848

(51) Int. Cl.
   *H01L 31/042* (2006.01)
(52) U.S. Cl. ................. 136/244; 136/251; 438/64; 438/66; 257/433
(58) Field of Classification Search ............... 136/244, 136/251, 291; 257/433; 438/64, 66, 67, 438/80; 52/173.3
See application file for complete search history.

(56) References Cited

U.S. PATENT DOCUMENTS

| | | | | |
|---|---|---|---|---|
| 5,505,788 | A | * | 4/1996 | Dinwoodie ................. 136/246 |
| 6,336,304 | B1 | * | 1/2002 | Mimura et al. ............. 52/748.1 |
| 6,365,824 | B1 | * | 4/2002 | Nakazima et al. ........... 136/251 |
| 6,525,264 | B2 | * | 2/2003 | Ouchida et al. ............. 136/246 |

FOREIGN PATENT DOCUMENTS

| | | | | |
|---|---|---|---|---|
| EP | 1071139 | A2 | * | 1/2001 |
| JP | 3027097 | U | | 5/1996 |
| JP | 10190035 | A | | 7/1998 |
| JP | 11-107453 | A | | 4/1999 |
| JP | 11-200561 | A | * | 7/1999 |
| JP | 2000096775 | A | | 4/2000 |
| JP | 2000-174313 | A | * | 6/2000 |
| JP | 2000-226908 | A | * | 8/2000 |
| JP | 2000274018 | A | | 10/2000 |
| JP | 2000-328747 | A | | 11/2000 |
| JP | 2000-352154 | A | | 12/2000 |
| JP | 2001-44480 | A | | 2/2001 |

OTHER PUBLICATIONS

Japanese language office action and its English language translation for corresponding Japanese application 2003532776 lists the references above.

* cited by examiner

*Primary Examiner*—Nam X Nguyen
*Assistant Examiner*—Luan V Van
(74) *Attorney, Agent, or Firm*—Hogan & Hartson LLP

(57) ABSTRACT

In a method of laying tiles and a solar cell module on a roof, at least one waterproof member is laid between the solar cell module and one tile laid adjacent in the direction of gradient of the roof.

5 Claims, 14 Drawing Sheets

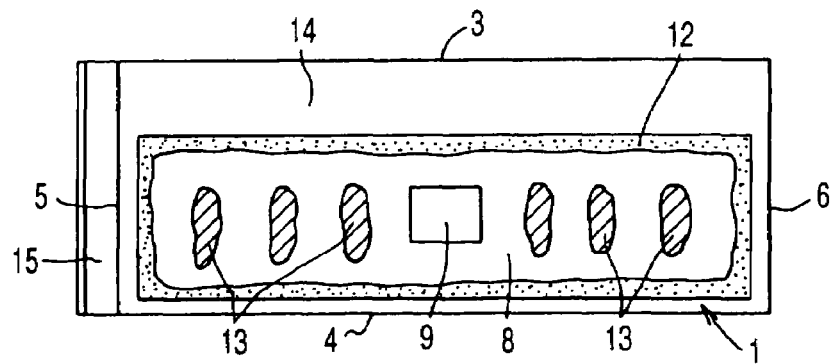
FIG. 4
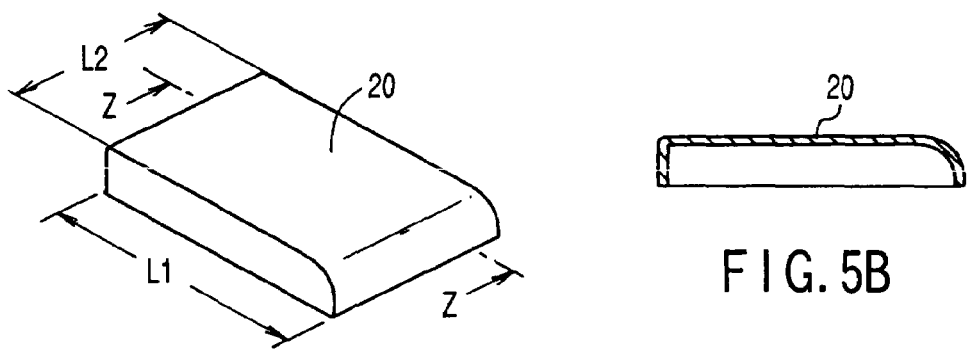
FIG. 5A
FIG. 5B
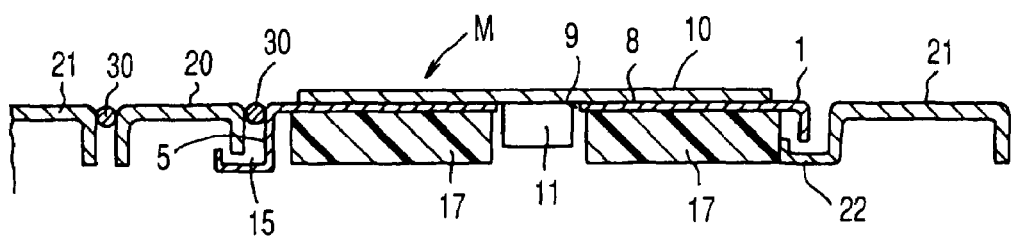
FIG. 6

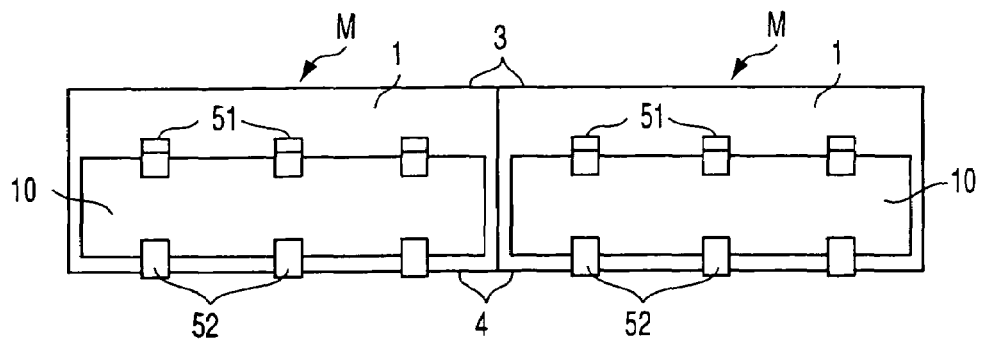
F I G. 18
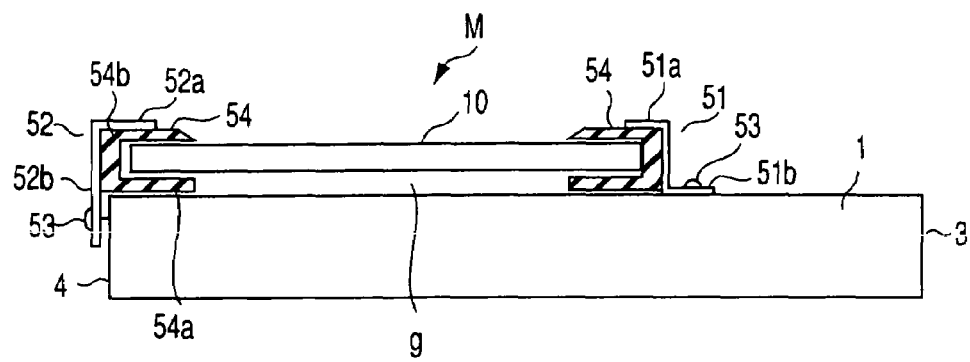
F I G. 19
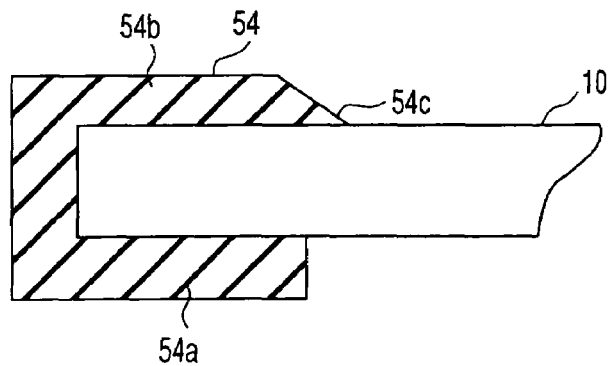
F I G. 20

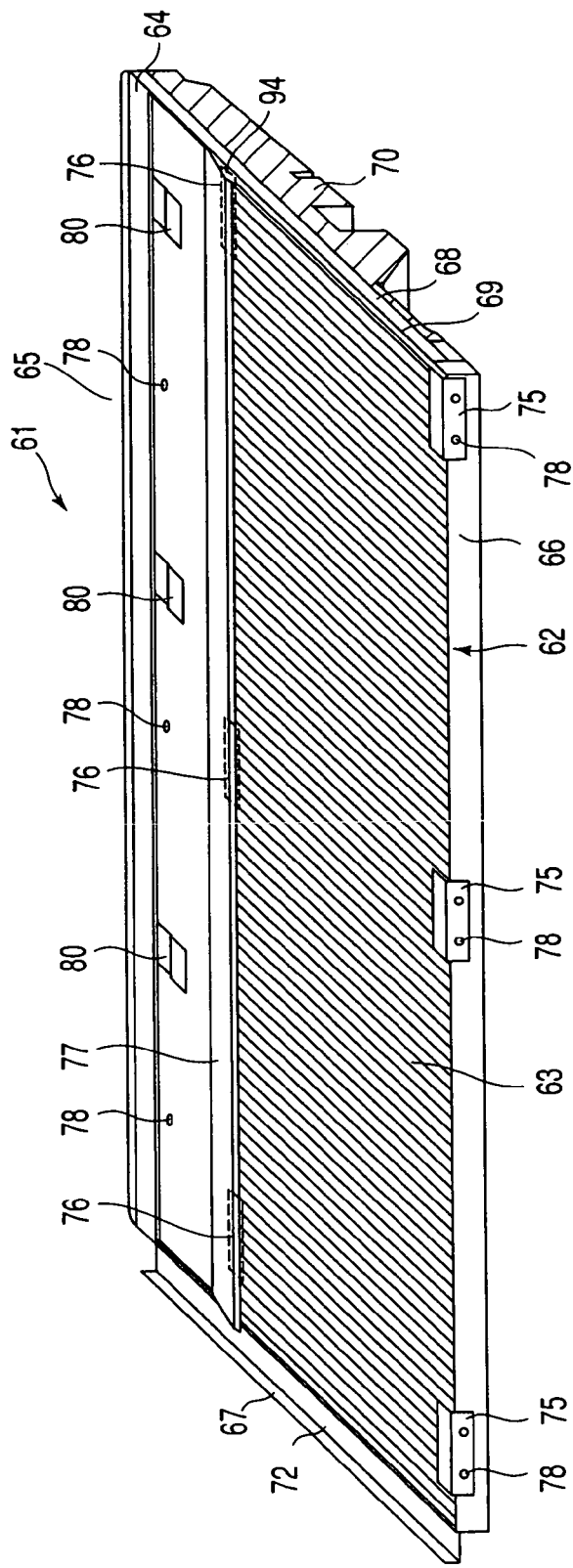
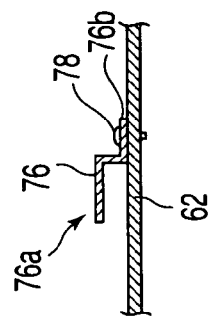
FIG. 21A
FIG. 21B

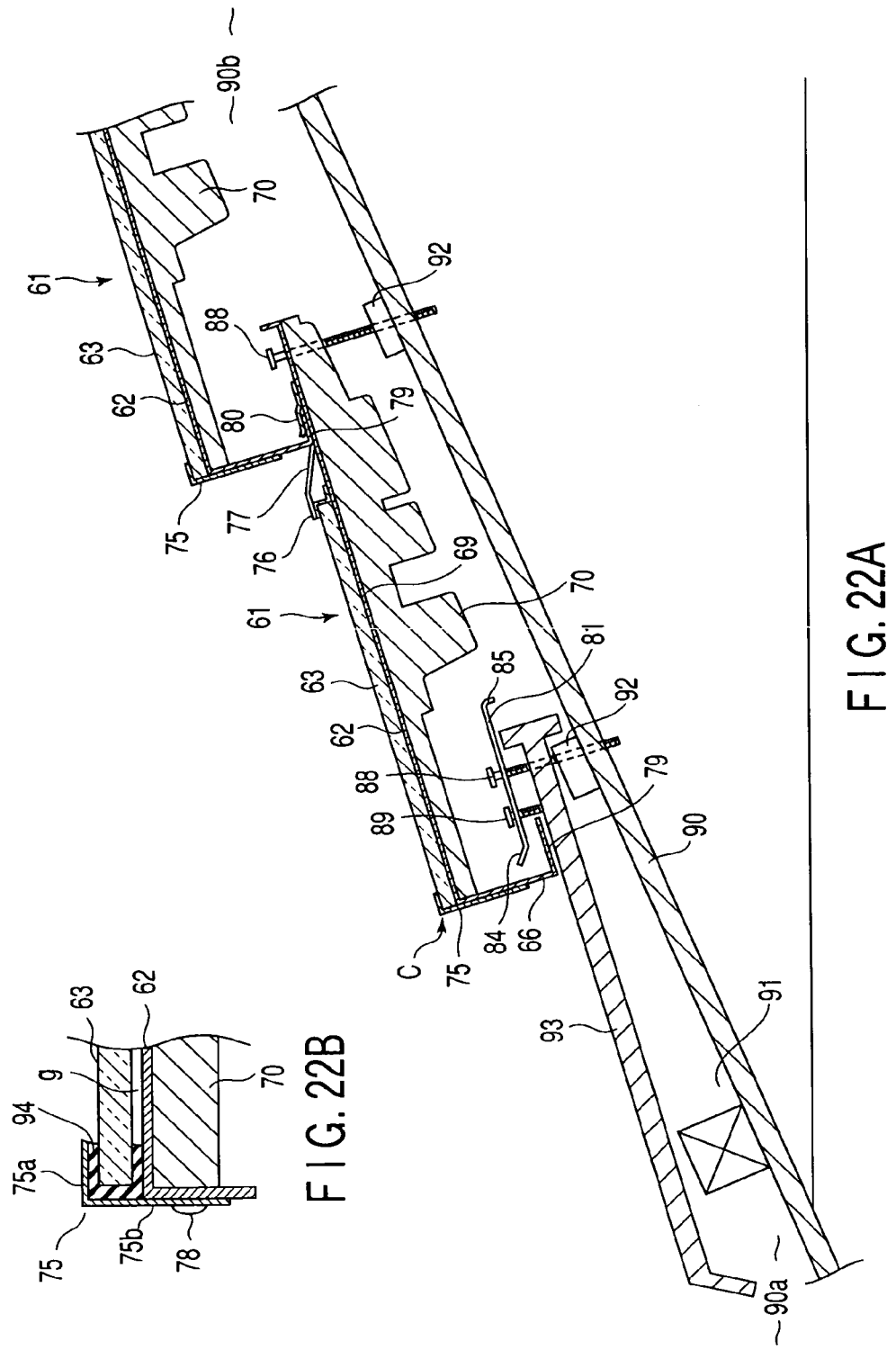

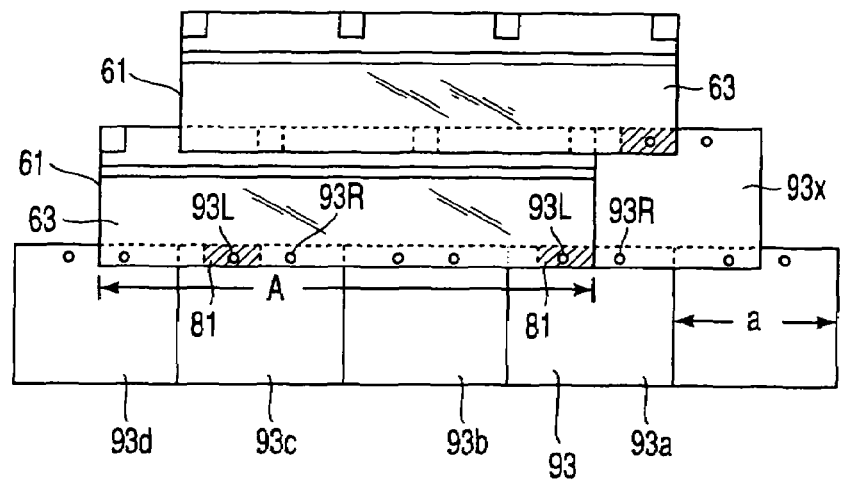
F I G. 24A
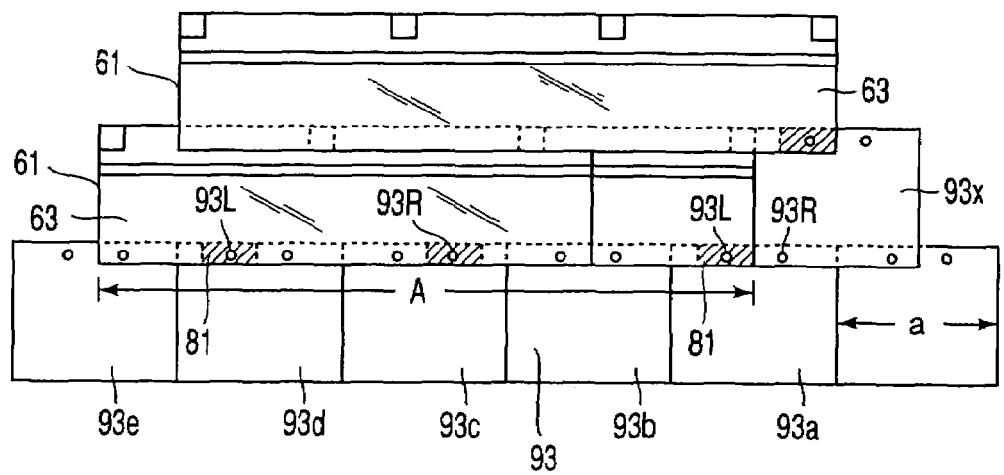
F I G. 24B

SOLAR CELL MODULE, METHOD OF LAYING SOLAR CELL MODULES, AND APPARATUS FOR PREVENTING SOLAR CELL MODULES FROM BEING BLOWN OFF

CROSS-REFERENCE TO RELATED APPLICATIONS

This is a Continuation Application of PCT Application No. PCT/JP02/05286, filed May 30, 2002, which was not published under PCT Article 21(2) in English.

This application is based upon and claims the benefit of priority from the prior Japanese Patent Applications No. 2001-304642, filed Sep. 28, 2001; No. 2001-316847, filed Oct. 15, 2001; and No. 2001-316848, filed Oct. 15, 2001, the entire contents of all of which are incorporated herein by reference.

BACKGROUND OF THE INVENTION

1. Field of the Invention

The present invention relates to a solar cell module to be laid, together with roof tiles, on the tile-base member provided on the roof of a building. The invention also relates to a method of laying solar cell modules and an apparatus for preventing solar cell modules from being blown off.

2. Description of the Related Art

A technique of laying solar cell modules on the roof of a building, together with ordinary roof tiles, is disclosed in, for example, Jpn. Pat. Appln. KOKAI Publication No. 11-200561. The technique is to provide waterproof junction between any solar-cell holding tile, or solar cell module, and the roof tiles.

More specifically, a solar-cell holding tile and a roof tile may be laid, adjacent to each other. In this case, a waterproof anchor having an elastic waterproof member is laid beneath the junction between the solar-cell holding tile and the roof tile. An overlap strip extends from the frame of the solar-cell holding tile, in the direction of the junction. The overlap strip has a hanging part. The hanging part abuts on an edge of the roof tile and remains in resilient contact with the elastic waterproof member of the waterproof anchor. Further, the gap between the roof tile and the hanging part of the overlap strip provided on the solar-cell holding tile is filled with caulking material.

Generally, fastening members that mechanically fasten solar cells to a base member mechanically are screws, bolt and nuts, or rivets. The junction between each solar cell and the base member is made waterproof, by use of caulking material, waterproof seal packing or the like.

The waterproof structure disclosed in Jpn. Pat. Appln. KOKAI Publication No. 11-200561 is designed to couple any two adjacent solar-cell holding tiles that are laid side by side. In this structure, the hanging part on the overlapping side abuts on the cell frame on the under-lapping side.

When solar-cell holding tiles are laid on the roof, however, all of them cannot contact at butting edges, due to the uneven surface of the roof and the error in arranging battens on the roof. There may be a gap of about 2 to 3 mm between the butting edges of the solar-cell holding tiles. Rainwater will likely be blown into the gap between the overlapping part of one tile and the under-lapping part of the other tile.

The rainwater thus blown into the gap turns into spray. Here arises a problem. The spray may leak from the sides of the under-lapping part (trough part) onto the tile-base member.

To provide a waterproof junction between any solar-cell holding tile and an adjacent roof tile, a water bar that has an elastic waterproof member may be used, or the gap between the solar-cell holding tile and the roof tile may be filled with caulking material. It is very troublesome to do so, requiring many steps and much time. The solar cells may be mechanically secured to the base member. In this case, it is necessary to render the junction between each solar cell and the base member waterproof, by using a caulking member, waterproof seal packing or the like. This requires many steps of manufacturing the solar cell module, inevitably increasing the manufacturing cost of the module.

Jpn. Pat. Appln. KOKAI Publication No. 11-107453 discloses a cell-holding frame to be laid on a roof-base member. The frame is made of incombustible material, or plate of light metal such as aluminum. Solar cells are fastened to and held in the cell-holding frame. The solar-cell holding frame is as large as a single roof tile, or as large as roof tiles combined together. That is, the solar-cell holding frame is designed on the basis of the shape of a roof tile.

Roof tiles are laid on the roof, spaced from one another at their trough parts, to provide gaps for draining rainwater. Hence, the following problem will arise when a solar-cell holding frame is laid together with roof tiles, if the solar-cell holding frame is one designed in accordance with the shape of a roof tile as disclosed in Jpn. Pat. Appln. KOKAI Publication No. 11-107453 and has a width that is an integral multiple of the width of a roof tile.

Assume that a solar cell module that has a width equal to the width of n roof tiles combined (where n is an integer greater than 1) is laid together with roof tiles. Then, the roof tiles lie over a distance longer by (n−1) gaps between the n roof tiles. Consequently, the roof tiles are displaced from the solar cell module in staggered fashion. A waterproof member must be used in order to compensate for the displacement.

It will be described how a solar cell module four times as broad as a roof tile, that is, n=4, is laid together with roof tiles.

FIG. 28 shows a comparative example. Numeral 40 designates a roof, and arrow 41 indicates the direction in which rainwater flows. Ordinary tiles 42 and solar cell modules 43 are laid together on the roof 40. Each module 43 is a solar-cell holding frame has a width four times as great as the effective width of one tile 42. Numeral 44 indicates the eaves side, and numeral 45 the ridge side.

First, some tiles 42 are laid on the roof 40, along the eaves side 44 from the right to the left. Then, some other tiles 42 are laid closer to the ridge side 45, in staggered fashion with respect to the tiles 42 first laid, each partly overlapping adjacent two tiles 42 already laid. Having an effective width A that is four times the effective width of the tiles 42, each solar cell module 43 is shorter by a distance equivalent to three gaps and is displaced to the right. Hence, the tiles 42 are staggered to those of the lower row on the right part X of the roof 40, but are gradually displaced toward the left. The tiles 42 cannot be laid in staggered fashion to those of the lower row, on the left part Y of the roof 40.

Tiles 42 are laid first along the eaves of the roof, from the right to the left, forming the first row, as in usual manner. Then, other tiles 42 are laid forming the second row, staggered to the tiles of the first row, each partly overlapping two adjacent tiles of the first row. Since the effective width A of each solar cell module 43 is four times as much as the effective width of one tile 42, the module 43 is shorter by a distance that corresponds to three gaps. Consequently, the module 43 is displaced to the right. Although the tiles are arranged in staggered fashion on the right part (part X) of the roof, the tiles of one row are gradually displaced toward the left. Eventually, the tiles of one row are almost aligned with those of the next row. The tiles cannot be laid in staggered fashion the left part (part Y) of the roof.

This not only results in design disharmony, but also dislocates the trough parts of the tiles. Rainwater may therefore leak.

Jpn. Pat. Appln. KOKAI Publication No. 2000-328747 discloses a technique of preventing tiles and solar cell modules from being blown away by a gust of wind. That is, battens and module-holding plates are secured to the roof panels. Then, solar cell modules and tiles are laid on the battens and fastened to the module-holding plates, such that the tiles have their eaves-side edges overlapping the ridge-side edges of the solar cell modules.

A reinforcing batten is laid on any roof panel that lies adjacent to the ridge side of a solar cell module. The tiles lying adjacent to the ridge side of the solar cell module are secured to the reinforcing batten with nail-shaped fasteners.

Japanese Utility Model Publication No. 3027097 discloses a technique of coupling an elongated metal plate to a batten by using S-shaped clips, in order to prevent tiles from being blown away by a gusty wind. Note that batten holds the eaves-side edges of tiles of one row and the ridge-side edges of tiles of the lower row.

According to Jpn. Pat. Appln. KOKAI Publication No. 2000-328747, the nail-shaped fasteners secure the eaves-side edges of tiles lying adjacent to the ridge side of the solar cell module, to the reinforcing batten. They do not secure the ridge side of the solar cell module at all. The ridge side of the solar cell module may therefore be blown off by a gusty wind.

According to Japanese Utility Model Publication No. 3027097, S-shaped clips couple tiles to one another. It is extremely difficult to use the clips in the case where the tiles are laid on the roof, together with solar cell modules.

An object of the present invention is to provide a solar cell module that can be laid on the roof, together with tiles, without causing any water leakage, and can provide design harmony, and to provide a method of laying solar cell modules of this type.

Another object of the invention is to provide a method of laying solar cell modules on the roof, together with tiles, to fasten the ridge side of each module to the roof easily and firmly so that the modules may be resistant to rainstorms and negative pressures, and to provide an apparatus that prevents solar cell modules from being blow off.

BRIEF SUMMARY OF THE INVENTION

According to the invention, there is provided a solar cell module which comprises a rectangular base member, a solar cell provided on an upper surface of the base member and an insulating support member provided on a lower surface of the base member, and configured to be laid together with tiles on the roof of a building. The solar cell module further comprises: an overlapping part provided on the base member and configured to overlap a trough section of an adjacent tile or a trough section of an adjacent solar cell module; and a projecting part provided on the base member and configured to overlap the trough section of the adjacent tile or the trough section of the adjacent solar cell module.

According to the invention, there is provided a method of laying solar cell modules together with tiles on the roof of a building. The method comprises: laying at least one waterproof member between each solar cell module and one tile which are laid adjacent in the direction of gradient of the roof.

According to this invention, there is provided an apparatus for preventing a solar cell module from being blown off, the solar cell module being laid together with tiles on a roof panel. Members for preventing the solar cell module from being blown off are provided at ridge sides of the tiles, coupling eaves side of the solar cell module laid at upper edges of the tiles to the ridge sides of the tiles.

BRIEF DESCRIPTION OF THE SEVERAL VIEWS OF THE DRAWING

FIG. 4 is a plan view of the base member of the first embodiment;

FIG. 5A is a perspective view depicting a waterproof member for use in combination with the first embodiment;

FIG. 5B is a sectional view taken along line Z-Z shown in FIG. 5A;

FIG. 6 is a longitudinal sectional view, illustrating a waterproof member laid between a roof tile and the solar cell module according to the first embodiment;

FIG. 18 is a plan view of a solar cell module according to a seventh embodiment of the invention;

FIG. 19 is a sectional view of a solar cell module according to an eighth embodiment of the invention;

FIG. 20 is a sectional view of the eighth embodiment, showing the gasket magnified;

FIG. 21A is a perspective view of a solar cell module according to a ninth embodiment of this invention;

FIG. 21B is a sectional view of a ridge-side fastener for holding the ninth embodiment;

FIG. 22A is a longitudinal sectional view showing the solar cell module according to the ninth embodiment, which is laid together with roof tiles;

FIG. 22B is a magnified view of part C of FIG. 22A;

FIGS. 24A and 24B are plan views, each illustrating the solar cell modules according to the ninth embodiment, which are laid together with roof tiles;

DETAILED DESCRIPTION OF THE INVENTION

Embodiments of the present invention will be described, with reference to the accompanying drawings.

Figure 1:
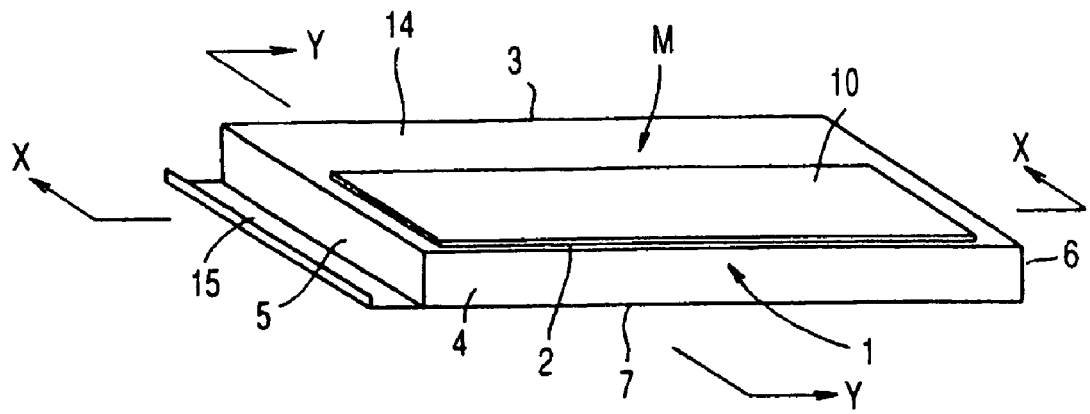
FIG. 1 is a perspective view showing a solar cell module according to a first embodiment of this invention.
Figure 2:
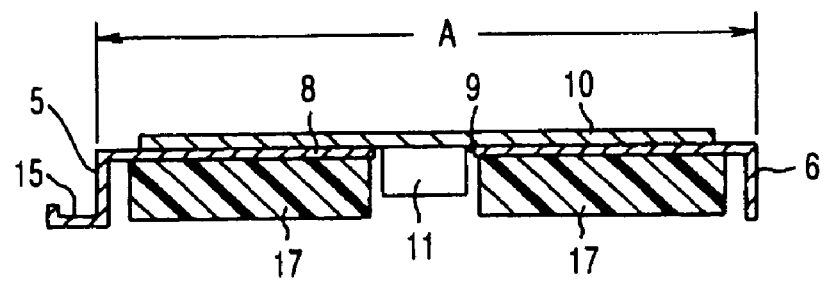
FIG. 2 is a sectional view taken along line X-X shown in FIG. 1.
Figure 3:
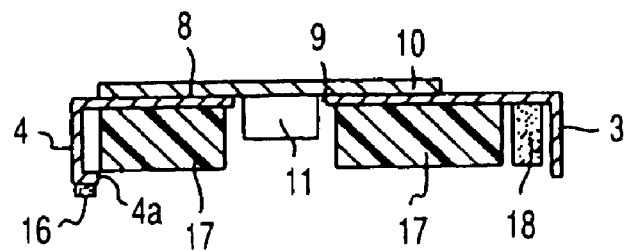
FIG. 3 is a sectional view taken along line Y-Y shown in FIG. 1.

FIGS. 1 to 9 shows the first embodiment of this invention. FIG. 1 is a perspective view of a solar cell module. FIG. 2 is a sectional view taken along line X-X shown in FIG. 1. FIG. 3 is a sectional view taken along line Y-Y shown in FIG. 1. FIG. 4 is a plan view of the base member of the solar cell module.

The solar cell module M will be described first. As FIG. 1 to 4 depict, the module M comprises a base member 1 and a solar cell 10 mounted on the base member 1. The base member 1 is a flat rectangular box made by bending is made of incombustible material, preferably a metal plate such as a steel plate, an aluminum plate or a stainless steel plate. The base member 1 may be coated or laminated with weather-resistant film.

The base member 1 has an upper surface, i.e., light-receiving surface 2, a ridge-side surface 3, an eaves-side surface 4, a trough-side surface 5, and an anti-trough-side surface 6. The base member 1 is a rectangular flat box, or a so-called bottomless box that opens at the roof-side surface 7 facing the roof, and has almost the same height as the ordinary tiles.

In most cases the base member 1 may be made of a coated steel plate in most cases, because the plate is inexpensive. The coating on the obverse side and reverse side of the member 1 differ in thickness. The coating on the obverse side is thick, and the coating on the reverse side is thin. A member of a desired size may be cut out from the base member 1. If the base member 1 is cut from the obverse side on which the thick coating lies, the coating will cover the cut edges. This expands the rust-prevented region as is desired. Thus, it is most desirable to cut the base member 1 at four edges, from the obverse surface. Nonetheless, the member 1 may be cut at a part most likely to be corroded or at, as described above, only a rusted part that is conspicuous. The direction in which the cutting proceeds can be determined from burrs or the like. A large rust-prevented region can therefore be provided at any position desired.

The base member 1 has a solar-cell holding region 8 on its light-receiving surface 2. The solar-cell holding region 8 has an opening 9 in its center part. The solar cell 10, which is a rectangular panel, is secured to the solar-cell holding region 8. The solar cell 10 has a terminal box 11, which is inserted in the opening 9.

The solar cell 10 can be any type, such as crystalline silicon type, polycrystalline silicon type, and amorphous silicon type. It is not limited to any particular type. Nevertheless, it is preferably a thin-film photoelectric transducer of polycrystalline type, amorphous type or the like. Of thin-film photoelectric transducers, the amorphous type and the tandem type are desirable and can be used. Note that the tandem type comprises an amorphous type and a polycrystalline type that is laid one upon the other.

To secure the solar cell 10, a seal 12 may be applied to the peripheral edges of the solar-cell holding region 8 and adhesive 13 is applied to the part surrounded by the seal 12. Then, the solar cell 10 is pressed onto the solar-cell holding region 8 and is thereby fixed thereto. If necessary, double-sided adhesive tape can be used in addition.

A fastening section 14 is provided on that region of the light-receiving surface 2 which is close to the ridge-side surface 3 and to which the solar cell 10 is not secured. The fastening section 14 is designed to fasten the base member 1 to a batten that is a roof member. A trough section 15 that has a substantially L-shaped cross section is formed integral with the base member 1, at the trough-side surface 5. The trough section 15 extends from the ridge-side surface 3 to the eaves-side surface 4. It guides rainwater and the like from the ridge-side surface 3 to the eaves-side surface 4.

A bent section 4a is provided at the lower end of the eaves-side surface 4, or near the roof-side surface 7 that faces the roof. An elastic strip 16 is adhered to the bent section 4a. The elastic strip 16 is shaped like a rectangular bar, having a thickness of 3 mm or more. The strip 16 is longer than the effective width of A of the solar cell module M. It extends to the bottom of the trough section 15. The elastic strip 16 may be made of sealing material such as silicone-based material or polyisobutylene-based material, rubber such as EPD-based rubber, or synthetic foam such as EPDM-based foam.

A reinforcing member 17 is provided in the base member 1 and reinforces the base member 1. The reinforcing member 17 prevents the base member 1 from being deformed when the base member 1 receives the weight of the worker who is laying roof tiles. The reinforcing member 17 is an insulating member that is made of synthetic resin foam and adhered to the lower surface of the base member 1 in the present embodiment. Nonetheless, it is not limited to an insulating member; it may be metal bar, a waving metal plate, a waving plate made of synthetic resin, a rubber block, or the like.

In the base member 1, a seal member 18 made of rubber or synthetic resin is provided at a position that corresponds to the fastening section 14. The seal member 18 is adhered to the lower surface of the base member of the base member 1.

FIG. 5A is a perspective view depicting a waterproof member 20. FIG. 5B is a sectional view taken along line Z-Z shown in FIG. 5A. The waterproof member 20 may be is made of incombustible material, for example, a steel plate, an aluminum plate or a stainless steel plate, or may be made by coating the incombustible member or by laminating the member with weather-resistant film. The waterproof member 20 is a rectangular flat box, or a so-called bottomless box that opens at the lower surface. It has almost the same height as the ordinary tiles.

The waterproof member 20 has a length L1, which is equal to the length of the solar cell module M and that of the ordinary tiles. The waterproof member 20 has a width L2, which is smaller than that of the ordinary tiles and is, for example, ¼, ⅓, ½ of the width thereof. Various types of waterproof members 20 that have different widths may be prepared. Then, the waterproof members of any type may be selected and used.

Figure 7:
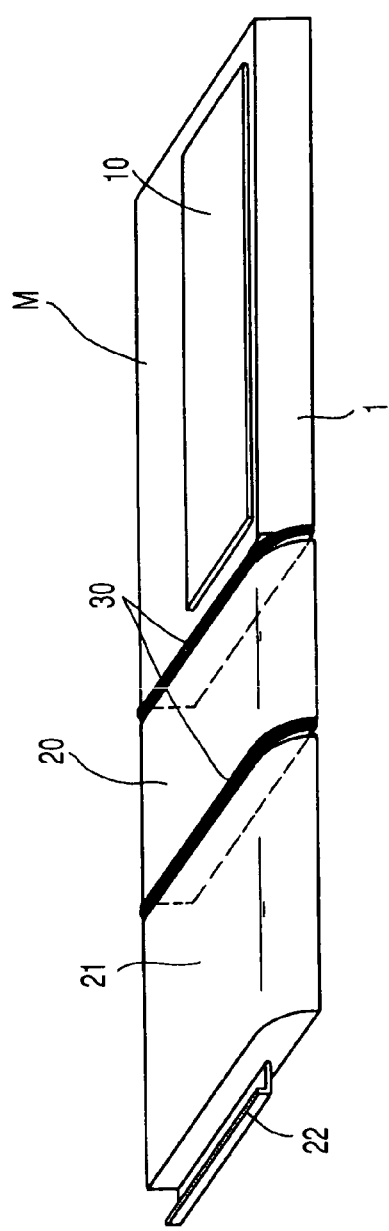
FIG. 7 is a perspective view showing the waterproof member laid between a roof tile and the solar cell module according to the first embodiment.
Figure 8:
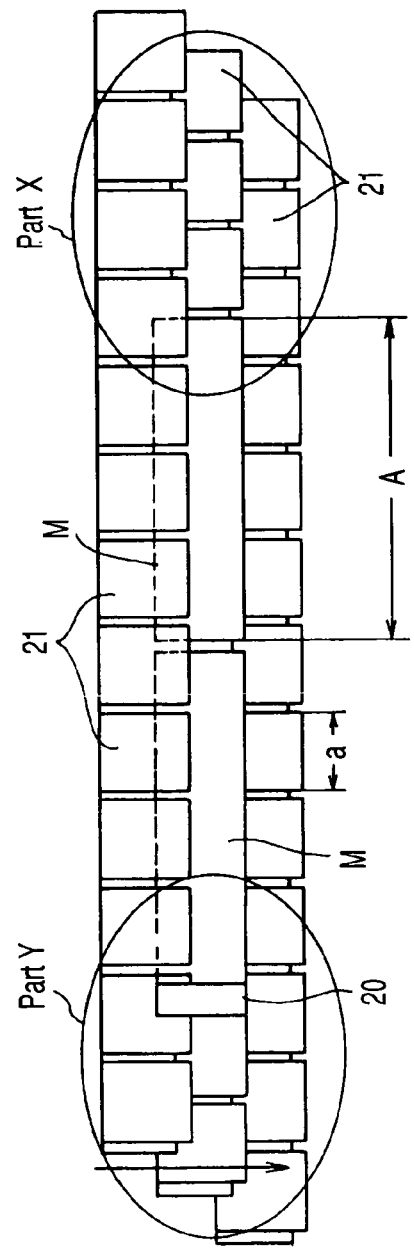
FIG. 8 is a plan view illustrating solar cell modules according to the first embodiment, which are laid together with roof tiles.
Figure 9:
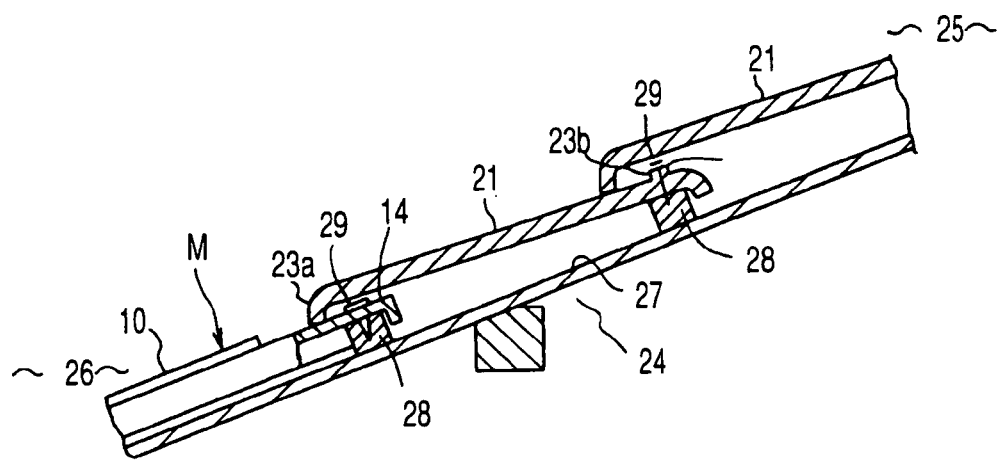
FIG. 9 is a sectional view of the roof on which the first embodiment is laid.

The solar cell module M and waterproof member 20, thus configured, are laid as is illustrated in FIGS. 6 to 9. FIG. 6 is a longitudinal sectional view, showing the waterproof member laid between a roof tile and the solar cell module. FIG. 7 is a perspective view showing the waterproof member so laid. FIG. 8 is a plan view illustrating solar cell modules that are laid together with roof tiles. FIG. 9 is a sectional view of the roof.

As FIGS. 6 to 9 show, the solar cell module M is laid together with ordinary tiles 21. The tiles 21 are shaped like a flat rectangular plate. They are, for example, ceramic tiles, thick straight tiles, thing straight tiles, metallic tiles, Japanese tiles, western tiles or the like. Each tile 21 has a trough section 22 at one side-edge. The trough section 22 fits with an adjacent tile 21. Each tile 21 has a hanging section 23a and a rising section 23b. The hanging section 23a projects downwards from the lower edge of the tile 21. The rising section 23b projects upwards from the upper edge of the tile 21. The hanging section 23a lies on the upper surface of the solar cell module M or adjacent tile 21 that is laid in the next lower row (i.e., next eaves-side row). The rising section 23b lies beneath the lower surface of the solar cell module M or adjacent tile that is laid in the next upper row (i.e., next ridge-side row).

In this embodiment, the solar cell module M and the tile 21 have a specific relation of A=4×a, where A is the effective width of the solar cell module M, measured in the direction at right angles to the gradient of the roof (i.e., direction in which rainwater flows), and a is the effective width of the tile 21, measured in the direction at right angles to the gradient of the roof (i.e., direction in which rainwater flows). In other words, the width of the solar cell module M is four times as large as the width of the tile 21.

Hence, the tiles 21 are spaced apart when they are laid in the direction at right angles to the gradient of the roof (i.e., direction in which rainwater flows). The gaps between the tiles 21 range 0.5 mm to 5 mm. Since solar cell modules M is laid together with the tiles 21 side by side, in a row, the tiles 21 are displaced from the tiles 21 arranged side by side, forming an adjacent row of tiles only.

Precisely, the solar cell modules M and the tiles 21 are arranged as is illustrated in FIG. 8. That is, the solar cell modules M configured as described above 21 are laid, together with tiles 21, on the roof 24 of a building, thus accomplishing so-called "tile laying." As FIG. 9, roof panels 27 are provided, forming the roof 24. Each roof panel 27 inclines in downward gradient, from the ridge side 25 to the eaves side 26. Battens 28 are provided on the roof panels 27.

The solar cell modules M and the tiles 21 are laid together, as shown in FIG. 8. First, tiles 21 are laid from the right part (part X) of the roof toward the left part (Y part) thereof, thus forming the first row, as in the case of the ordinary tile-laying work. Then, other tiles 21 of the upper row are laid on the roof panels 27 in staggered fashion, one after another toward the ridge side 25. It will be explained how a plurality of tiles 21 and two solar cell modules M are laid together to form a second row.

The tiles 21 of the first row are fastened to the battens 28 in the same as in the ordinary tile-laying work. That is, nails are driven into the battens 28 through the nail holes 23c made in the rising sections 23b of the tiles 21. After these tiles 21 are thus laid, the tiles 20 and the solar cell modules M are laid to form the second row. The tiles 21 of the second row are laid, with their hanging sections 23a overlapping the rising sections 23b of the tile 21 of the first row. Then, the tiles of the second row are fastened to the battens 28 in the same way as the tiles 21 of the first row.

The solar cell modules M positioned adjacent to the tiles 21 of the second row are laid, with their anti-trough-side surface 6 overlapping the trough sections 22 of the tiles 21. At the junction between the solar cell modules M, the trough section 15 of one solar cell module M overlaps the anti-trough-side surface 6 of the other solar cell module M. At the trough-side surface 5 of either solar cell module M, which lies adjacent to a tile 21 of the second row, one side-edge of a waterproof member 20 overlaps the trough section 15 of the solar cell module M. The other side-edge of the waterproof member 20 is positioned adjacent to a tile 21. Thus, the adjacent solar cell modules M can be laid side by side, or each solar cell module M and a tile 21 can be laid side by side, with a waterproof member 20 interposed between them.

At this time, a seal member 30 is provided in the gap between the solar cell module M and the waterproof member 20, and another seal member 30 is provided in the gap between the waterproof member 20 and the tile 21. A waterproof structure is thereby formed. The seal members 30 may be made of sealing material such as silicone-based material or polyisobutylene-based material, synthetic resin represented by EPDM-based resin, or foamed sealing tape made of rubber. The seal members 30 are bonded with adhesive or the like, to the solar cell module M, waterproof member 20 and tile 21, reliably sealing these components together. A seal member 30 may be previously adhered or secured to one side of the waterproof member 20.

As indicated above, when the solar cell modules M and the tiles 21 are laid side by side in a row, the sides of tiles 21 are displaced from the sides of the tiles of the next row, either upper or lower row, due to the gaps between the tiles 21. Nonetheless, this displacement can be eliminated since a waterproof member 20 that is narrower than the tiles 21 is interposed between each solar cell module M and one tile 21.

Various types of waterproof members 20 that have different widths L1 may be prepared. Then, the waterproof members 20 of any type may be selected in accordance with the displacement and used to eliminate the displacement.

Accordingly, the sides of the tiles are staggered with respect to those of the tiles of the adjacent row, in the same way at the right part (pat X) and left part (Y part) of the roof as is illustrated in FIG. 8. This accomplishes design harmony. In addition, the positional relation between the trough sections 22 of the tiles 21 of any row and those of the tiles 21 of the upper or lower row serves to provide a waterproof function. This prevents water from leaking, achieving reliable sealing.

To fasten the solar cell modules M to the battens 28, nails 29 are driven into the fastening section 14. Then, the nails 29 pass through the seal members 18 and are secured to the battens 28. The gap between any nail 29 and the nail hole is sealed with the seal member 18. The seal members 18 prevent rainwater and the like from flowing inside.

When each solar cell modules M is fastened to the battens 28, the weight of the solar cell module M and the pushing force of the nails 29 are applied to the tiles 21 of the first row. The elastic strips 16 provided on the base member 1 are deformed in conformity with the undulation defined by the tiles 21 of the first row. Since the elastic strips 16 have the tendency of following the undulation, they fill gaps to prevent wind and water from entering. Further, the elastic strips 16 acts as buffers for lessening the impact and load that the worker exerts while stepping on the solar cell modules M. The elastic strips 16 cooperate with the reinforcing member 17 provided in the base member 1, to prevent the base member 1 from being deformed or broken.

After the tiles 21 and the solar cell modules M are laid together, forming the second row, only tiles 21 are laid, forming the third row, in the same way the second. The tiles 21 of the third row have their hanging sections 23a covering the fastening sections 14 of the solar cell modules M. Therefore, the nails 29 would not be exposed.

Figure 10:
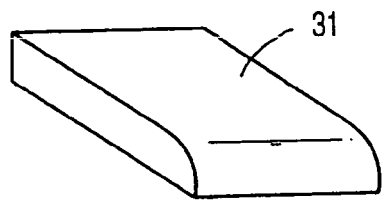
FIG. 10 is a perspective view of a waterproof member for use in combination of a second embodiment of the invention.

FIG. 10 depicts the second embodiment. More precisely, it shows a waterproof member 31 that has been made by cutting an ordinary tile in the longitudinal direction. The member 31 has a width that is, for example, ¼, ⅓, ½ of the width of the ordinary tile. Various types of waterproof members 31 having different widths L1 may be prepared. Then, the waterproof members of any type may be selected and used. However, the displacement that will result from the gaps between the tiles 21 can hardly predicted with accuracy. It is therefore desirable to cut some tiles 21 at the tile-laying site, in accordance with the displacement measured at the site, and to use these tiles 21 as waterproof members 31.

Figures 11A, 11B:
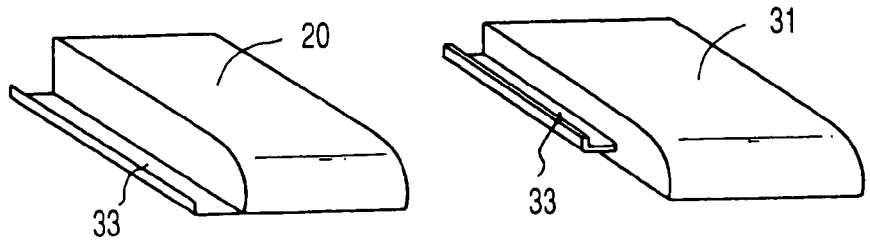
FIGS. 11A and 11B are perspective views showing a waterproof member for use in combination with a third embodiment of this invention.
Figure 12:
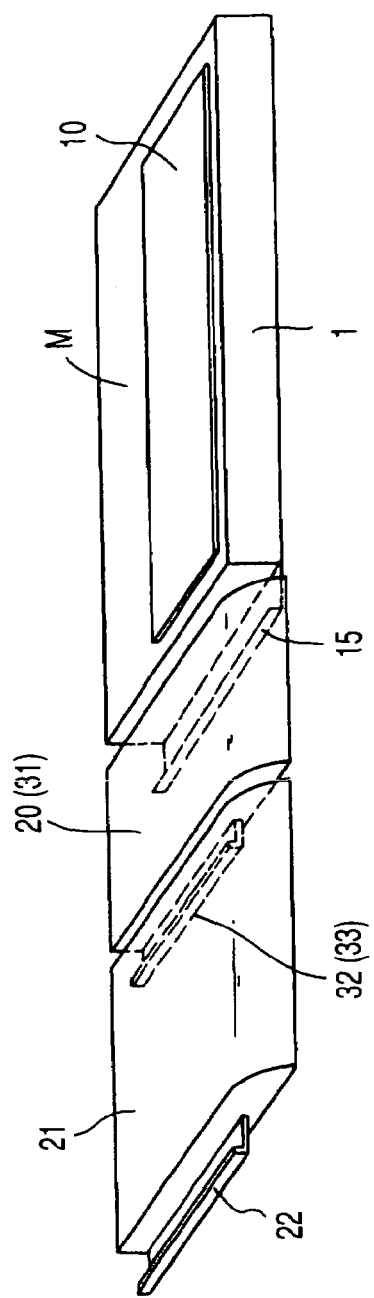
FIG. 12 is a perspective view illustrating the waterproof member laid between a roof tile and the solar cell module according to the third embodiment.

FIGS. 11A, 11B and 12 show the third embodiment. FIG. 11A depicts a waterproof member that is identical to the waterproof member 20 of the first embodiment, but has a trough section 32 provided on one side. FIG. 11B illustrates a waterproof member that is identical to the waterproof member 31 of the second embodiment, but has a trough member 22 provided on one side.

As indicated above, the trough sections 32 and 33 are provided on the waterproof members 20 and 31, respectively. Therefore, the trough section 32 (33) of the waterproof member 20 (31) covers the gap between the waterproof member 20 (31) and the tile 21. This provides a waterproof structure. The seal members 30 used in the first embodiment are therefore unnecessary, which makes the work more easy.

Figure 13:
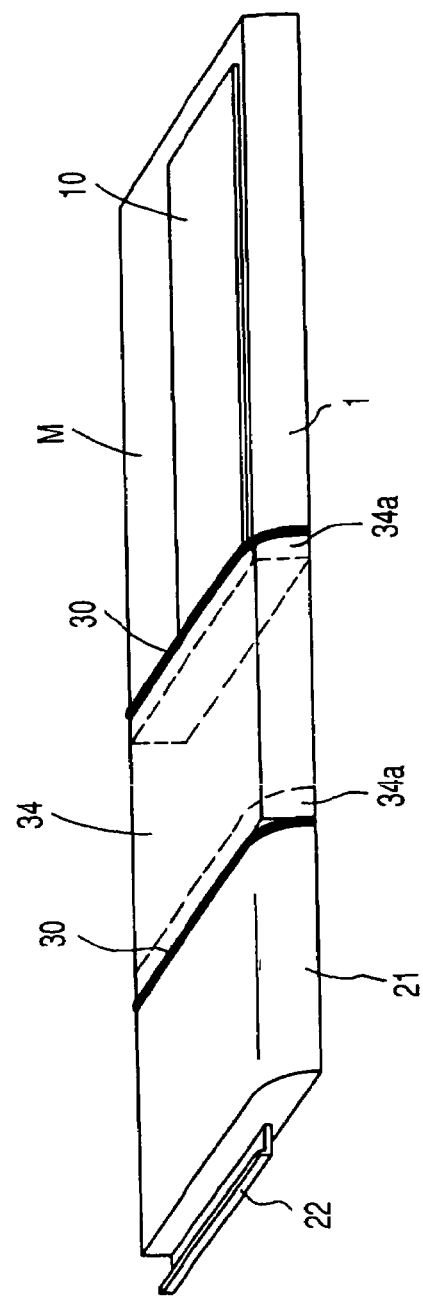
FIG. 13 is a perspective view illustrating a waterproof member laid between a roof tile and the solar cell module according to a fourth embodiment of this invention.

FIG. 13 illustrates the fourth embodiment. More correctly, FIG. 13 is a perspective view depicting a waterproof member 34 that overlaps a solar cell module M and a tile 21 at the opposing sides the of module M and tile 21. This waterproof member 34 is a plate that is curved in conformity with the upper surfaces of the tile 21 and solar cell module M. The side edges 34a of the waterproof member 34 overlap one side edge of the tile 21 and one side edge of the module M, respectively. If necessary, seal members 30 may be used at the side edges 34a to provide a watertight structure.

In this embodiment, the distance for which the waterproof member 34 overlaps the tile 21 and the solar cell module M can be adjusted even if the displacement resulting from gaps. This also facilitates the work.

Figure 14:
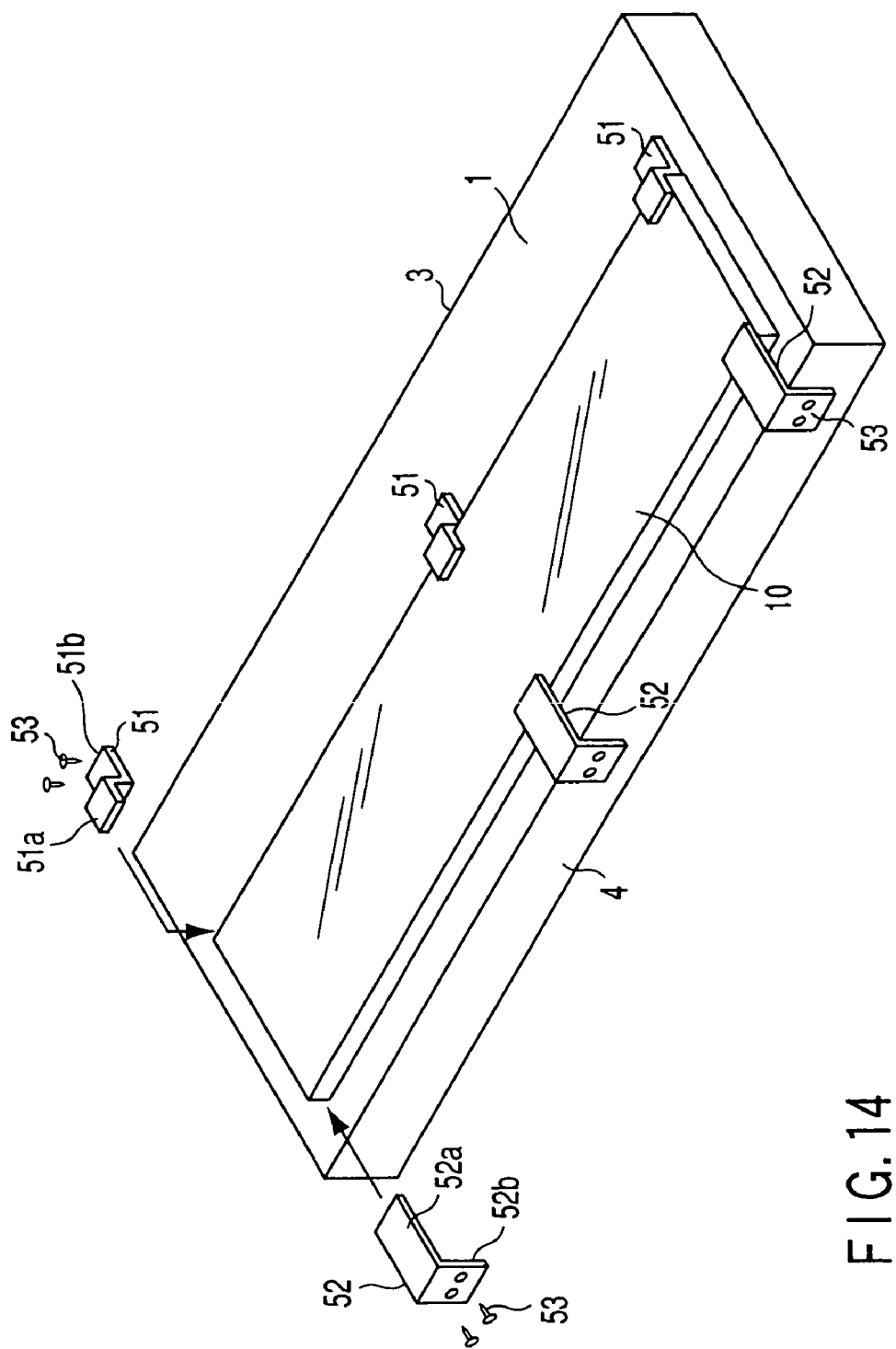
FIG. 14 is a perspective view of a solar cell module according to a fifth embodiment of the invention.
Figure 15:
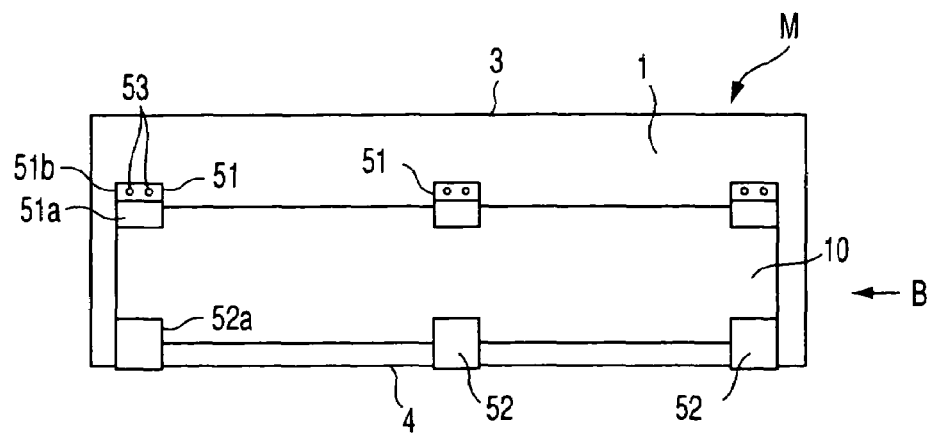
FIG. 15 is a plan view of the solar cell module according to the fifth embodiment.
Figure 16:
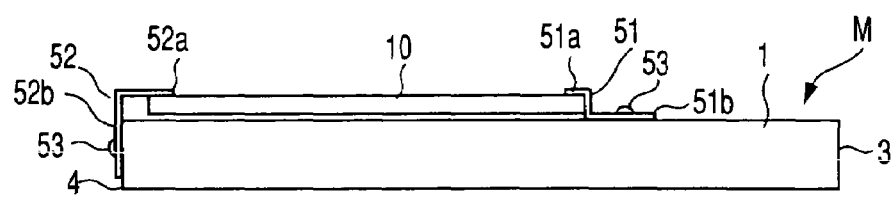
FIG. 16 is a side view of the fifth embodiment, as viewed in the direction of arrow B shown in FIG. 15.

FIGS. 14 to 16 show the fifth embodiment. The components identical to those of the first embodiment are designated at the same reference numerals in these figures and will not be described. In this embodiment, the solar cell 10 is mechanically fastened to the base member 1 with fastening strips.

To be more specific, the solar cell 10 is mounted on the upper surface of the base member 1, deviated toward the eaves-side surface 4. Ridge-side fastening strips 51 fasten the ridge side of the solar cell 10 to the base member 1, at three positions, i.e., the end parts and middle part of the ridge side. Further, eaves-side fastening strips 52 fasten the eaves side of the solar cell 10 to the base member 1, at three positions, i.e., the end parts and middle part of the eaves side.

The ridge-side fastening strips 51 have been made by bending metal plates in the form of a crank. Each strip 51 comprises an upper-end part, or pressing part 5a, and a lower-end part, or fastening part 51b. The parts 51a and 51b are formed integral with each other. The pressing part 51a presses the edge of the light-receiving surface of the solar cell 10. The fastening part 51b fastens the solar cell 10 to the base member 1.

The eaves-side fastening strips 52 have been made by bending metal plates in the form of L. Each strip 52 comprises an upper-end part, or pressing part 52a, and a lower-end part, or fastening part 52b. The parts 52a and 52b are formed integral with each other. The pressing part 52a presses the edge of the light-receiving surface of the solar cell 10. The fastening part 52b fastens the solar cell 10 to the base member 1.

The fastening part 51b of the ridge-side fastening strip 51 is secured to the upper surface of the base member 1 by means of fastening screws or rivets 53. The fastening part 52b of the eaves-side fastening strip 52 is secured to the eaves-side surface 4 of the base member 1 by means of fastening screws or rivets 53. Thus, the solar cell 10 is fastened to the base member 1, by the ridge-side fastening strip 51 arranged at regular intervals along the ridge side of the cell 10 and by the eaves-side fastening strips 52 arranged at regular intervals along the eaves side of the cell 10. The strips 51 oppose the strip 52 across the cell 10.

Like the base member 1, the ridge-side fastening strip 51 and eaves-side fastening strips 52 are metal plates such as steel plates, aluminum plates or stainless steel plates. The strips 51 and 52 may be coated or laminated with weather-resistant film.

Figure 17:
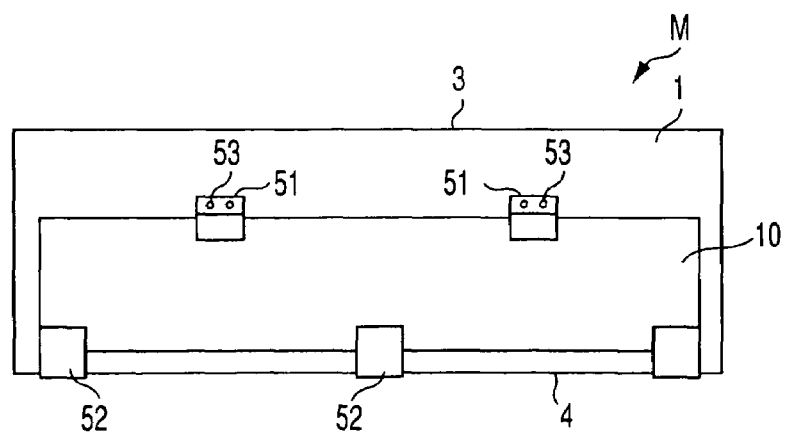
FIG. 17 is a plan view of a solar cell module according to a sixth embodiment of the present invention.

FIG. 17 shows the sixth embodiment. The components identical to those of the fifth embodiment are designated at the same reference numerals and will not be described. In this embodiment, two ridge-side fastening strips 51 fasten the solar cell 10 to the base member 1 at the ridge side thereof, and three eaves-side fastening strips 52 fasten the solar cell 10 at the eaves side thereof. The ridge-side fastening strips 51 are staggered with respect to the eaves-side fastening strips 52. Thus arranged, the fastening strips 51 and 52 can buffer an impact to the surface of the solar cell. This prevents the solar cell from being broken.

FIG. 18 depicts the seventh embodiment. The components identical to those of the fifth embodiment are designated at the same reference numerals and will not be described. In the present embodiment, solar cell modules M are arranged side by side in a row. The solar cell 10 of each solar cell module M is fastened to the base member 1 by the ridge-side fastening strips 51 and eaves-side fastening strips 52, which are spaced at the same intervals as those used to fasten the solar cell 10 of any other solar cell module M.

In the fifth to seventh embodiments described above, the solar cell 10 can be efficiently and firmly fastened to the base member 1 at both the ridge side and the eaves side, by means of the ridge-side fastening strips 51 and eaves-side fastening strips 52. Should the solar cell modules M be exposed to a strong wind like a typhoon, the solar cells 10 would not move up or down, be peeled off, or be broken. Moreover, the fastening strips may add something to design effect because they are arranged at regular intervals.

FIGS. 19 and 20 illustrate the eighth embodiment. The components identical to those of the fifth embodiment are designated at the same reference numerals and will not be described. In this embodiment, gaskets 54 are mounted on the ridge-side and eaves-side edges of the solar cell 10 and used as buffer members. When the ridge-side fastening strips 51 and eaves-side fastening strips 52 fasten the solar cell 10 to the base member 1, the gaskets 54 are clamped between the solar cell 10 and the pressing parts 51a and 52a of the ridge-side fastening strips 51 and eaves-side fastening strips 52.

The gaskets 54 may be made of heat-resistant vinyl chloride resin, EPDM, silicone resin or the like. The gaskets 54 have a U-shaped cross section and can hold the edge of the solar cell 10. The lower part 54a of each gasket 54 is interposed between the base member 1 and the solar cell 10, providing a gap g of 3 mm or more, through which rainwater can be drained. The upper part 54b of each gasket 54 has an acute-angle tip 54c. Thus, it does not block the solar rays to form a shadow on the solar cell 10.

The present embodiment achieves the same advantages as the fifth to seventh embodiments. It is also advantageous in that the gaskets 54 function as buffers to protect the solar cell 10 not only from vibration and impact due to earthquake, but also from thermal shock resulting from the fastening strips.

FIG. 21A to FIG. 24A and FIG. 24B depict the ninth embodiment. FIG. 21 is a perspective view of the solar cell module. FIG. 22A is a longitudinal sectional view showing the solar cell module, which is laid together with roof tiles. FIG. 22B is a magnified view of part C of FIG. 22A. FIG. 23A is a perspective view of a fastening strip for preventing the solar cell module from being blown off. FIG. 23B is a perspective view depicting holding strips. FIGS. 24A and 24B are plan views, each illustrating the solar cell modules that are laid together with roof tiles.

The solar cell module 61 will be described with reference to FIG. 21A and FIG. 21B. The solar cell module 16 comprises a base member 62 and a solar cell 63 mounted on the base member 62. The base member 62 is a flat rectangular box made by bending is made of incombustible material, preferably a metal plate such as a steel plate, an aluminum plate or a stainless steel plate. The base member 62 may be coated or laminated with weather-resistant film.

The base member 62 has an upper surface 64, a ridge-side surface 65, an eaves-side surface 66, a trough-side surface 67, and an anti-trough-side surface 68. The base member 62 is a rectangular flat box, or a so-called bottomless box that opens at the roof-side surface 69 facing the roof. The base member 62 has almost the same height as the ordinary tiles. A reinforcing member 70 is provided on the lower surface of the base member 62 and reinforces the base member 62.

The reinforcing member 70 prevents the base member 62 from being deformed when the base member receives the weight of the worker who is laying roof tiles. The reinforcing member 70 is an insulating member that is made of synthetic resin foam and adhered to the lower surface of the base member in the present embodiment. Nonetheless, the reinforcing member 70 is not limited to an insulating member; it may be metal bar, a waving metal plate, a waving plate made of synthetic resin, a rubber block, or the like.

The solar cell 63 that is shaped like a rectangular panel is mounted on the upper surface 64, close to the eaves-side surface 6. The solar-cell holding region of the upper surface 64 of the base member 62 has an opening (not shown) in almost the center part. The solar cell 63 has a terminal box (not shown), which is inserted and fixed in the opening.

The solar cell 63 can be any type, such as crystalline silicon type, polycrystalline silicon type, and amorphous silicon type. It is not limited to any particular type. Nevertheless, it is preferably a thin-film photoelectric transducer of polycrystalline type, amorphous type or the like. Of thin-film photoelectric transducers, the amorphous type and the tandem type are desirable and can be used. Note that the tandem type comprises an amorphous type and polycrystalline type that are laid one upon the other.

The solar cell 63 can be secured to the base member 62, by using either adhesive or the like, or using a mechanical means. If adhesive is used, it is applied to the peripheral edges of the solar-cell holding region. Then, the solar cell 63 is pressed onto the solar-cell holding region and is thereby fixed thereto. If necessary, double-sided adhesive tape can be used in addition.

How the solar cell 63 is secured mechanically will be explained.

Eaves-side fastening strips 75 fasten the eaves side of the solar cell 63 to the base member 62, at three positions, i.e., the end parts and middle part of the eaves side. Three ridge-side fastening strips 51 that are positioned symmetrical to the eaves-side fastening strips 75 fasten the ridge side of the solar cell 63 to the base member 62.

The eaves-side fastening strips 75 have been made by bending metal plates in the form of L. Each strip 75 comprises an upper-end part, or pressing part 75a, and a lower-end part, or fastening part 75b. The parts 75a and 75b are formed integral with each other. The pressing part 75a presses the edge of the light-receiving surface of the solar cell 63, with a gasket 94 interposed between it and the edge of the light-receiving surface. The fastening part 52b of the eaves-side fastening strips 75 is fastened to the base member 62 by means of fastening screws or rivets 78.

Ridge-side fastening strips 76 are used. They have been made by bending metal plates in the form of a crank. Each strip 76 has a pressing part 76a at one side and a fastening part 76b at the other side. The pressing part 76a is designed to press the edge of the light-receiving surface of the solar cell 63 onto the base member 62, with the gasket 94 interposed between it and the light-receiving surface. The fastening part 76b is designed to fasten the solar cell 63 to the base member 62 fastening part 76b is fastened to the ridge-side surface of the base member 62 by means of fastening screws or rivets 78.

Like the base member 62, the ridge-side fastening strip 76 and eaves-side fastening strips 75 are metal plates such as steel plates, aluminum plates or stainless steel plates. The strips 75 and 76 may be coated or laminated with weather-resistant film.

The gaskets 94 may be made of heat-resistant vinyl chloride resin, EPDM, silicone resin or the like. The gaskets 94 have a U-shaped cross section and can hold the edge of the solar cell 63. The lower part of each gasket 94 is interposed between the base member 62 and the solar cell 63, providing a gap g of 3 mm or more, through which rainwater can be drained.

A fastening strip 79 bent in the form of L is formed integral with the base member 62, at the lower edge of the eaves-side surface 66. Holding strips 80 are provided on that region of the upper surface 64 of the base member 62, in which the solar cell 63 is not mounted. More precisely, the holding strips 80 are provided on a ridge-side cover strip 77. Each holding strip 80 has been made by bending a metal plate in the form of L and opens to the eaves side. The holding strips 80 are arranged at four positions, i.e., the end parts and middle parts of the ridge side of the base member 62.

Figure 23A:
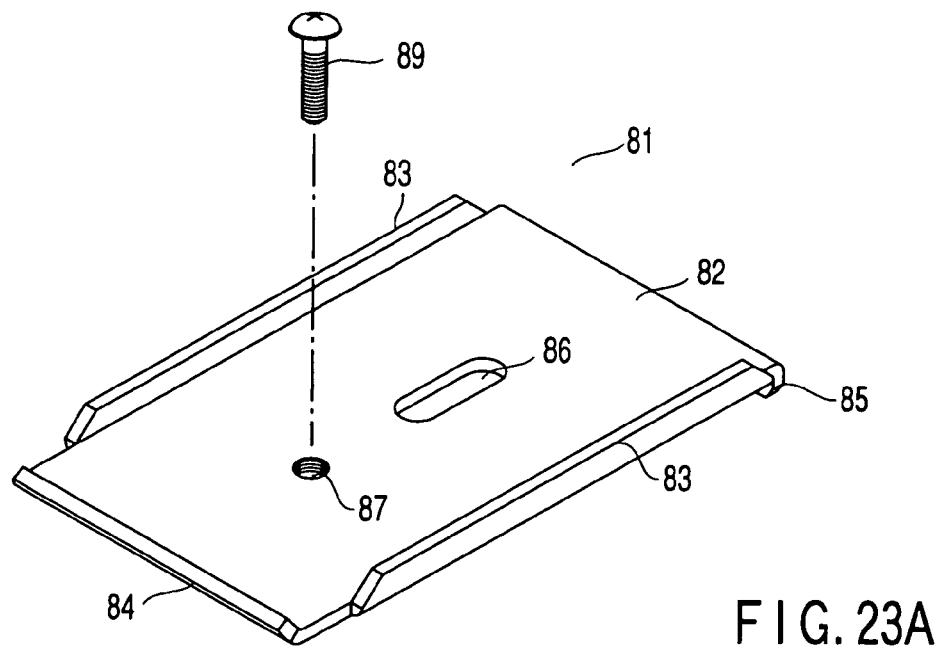
FIG. 23A is a perspective view of a fastening strip for use in the ninth embodiment, to prevent the solar cell module from being blown off.
Figure 23B:
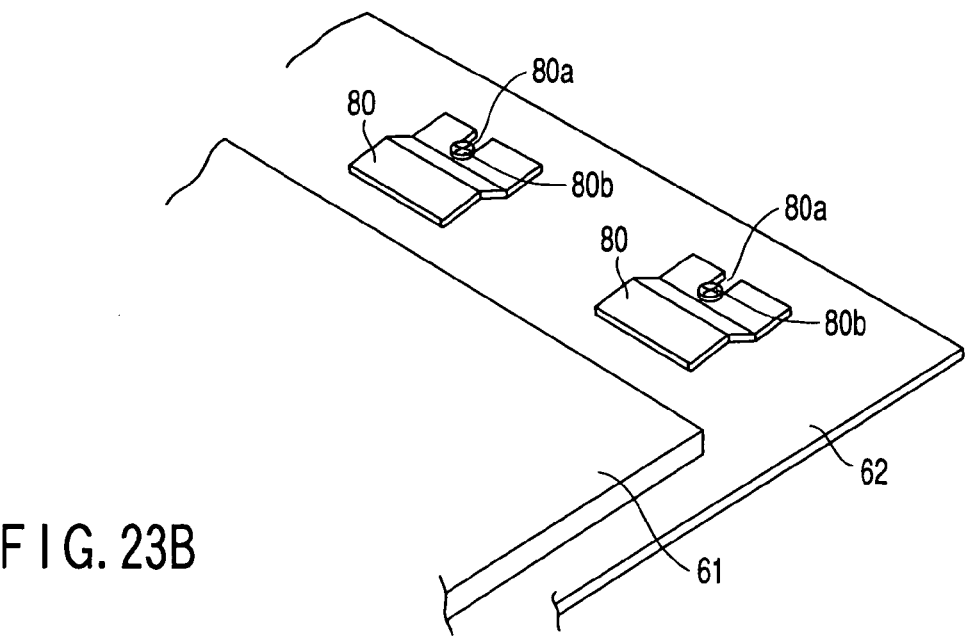
FIG. 23B is a perspective view depicting holding strips used in the ninth embodiment.

As shown in FIG. 23B, each holding strip 80 has an opening at one edge, in which the fastening strip 79 is inserted. The holding strip 80 has a fastening slit 80a in the proximal part. A fastening screw 80b is driven through the slit 80a into the base member 62. Thus, the holding strip 80 is removably secured to the base member 62.

Tiles are laid on the ridge side of the solar cell module 61 already laid on the roof. In some cases, the holding strips 80 may hinder the tile-laying work. Nonetheless, the holding strips 80 can be easily removed from the base member 62, merely by loosening the fastening screws 80b.

A trough section 72 that has a substantially L-shaped cross section is formed integral with the base member 62, at the trough-side surface 67 thereof. The trough section 72 extends from the ridge-side surface 65 to the eaves-side surface 66. It guides rainwater and the like from the ridge-side surface 65 to the eaves-side surface 66.

A fastening strip 81 for preventing the solar cell module from being blown off is provided. As FIG. 23A depicts, the fastening strip 81 comprises a main part 82 and two rising parts 83. The main part 82 is a rectangular metal plate. The rising parts 83 are provided at the longitudinal sides of the main part 82, reinforcing the same. The front edge of the main part 82 is bent upwards, forming an engaging part 84. The rear edge of the main part 82 is bend downwards, forming a reinforcing part 85. The engaging part 84 is engaged with the fastening strip 79.

The fastening strip 82 has an elongated hole, or fastening hole 86 made in the center part of the main part 82. The fastening hole 86 extends in the longitudinal direction. The strip 81 has a screw hole 87, which is located in front of the fastening hole 86. The fastening hole 86 holds a fastening screw 88 that is shaped like a nail as will be described later. The screw hole 87 holds, in screw engagement, a height-adjusting screw 89, which will be described later.

A method of laying the solar cell modules together with tiles will be described.

In FIGS. 22A and 22B, 90 denotes a roof panel, reference numeral 90a represents the ridge side of the roof, and 90b designates the eaves side of the roof. Battens 91 and support members 92 are secured to the upper surface of the roof panel 90, each extending in transverse direction. Ordinary tiles 93 are laid on one batten 91 and one support member 92, side by side in the transverse direction.

The tiles 93 are, for example, ceramic tiles, thick straight tiles, thing straight tiles, metallic tiles, western tiles or the like. The fastening strips 81 for preventing the solar cell module from being blown off are positioned on the ridge-side edges of some of the tiles 93. A fastening screw 88 is inserted in the fastening hole 86 of each fastening strip 81, passes through either the through hole 93R or 93L made in a tile 93, and is driven into the roof panel 90 through the support member 92. Each fastening strip 81 is thereby secured to the roof panel 90. Since the fastening hole 86 is elongated extending in the direction of inclination of the roof, the strip 81 can slide. Hence, the fastening strip 81 can be adjusted in position.

A height-adjusting screw 89 is set in screw engagement in the screw hole 87 of the fastening strip 81. Its distal end abuts on the upper surface of the tile 93. The fastening strip 81 can therefore be adjusted in height measured from the upper surface of the tile 93. Particularly, the engaging part 84 of the strip 81 can be adjusted in height. Since the fastening strip 81 for preventing the solar cell module can be adjusted in both position and height, it can be used to secure various types of tiles that differ in surface shape.

A solar cell module 61 is laid at the upper edges (ridge-side edges) of the tiles 93 laid side by side in a row. First, the solar cell module 61 is positioned, with its eaves-side edge placed on the ridge-side edges of the tiles 93. Next, the solar cell module 61 is slid toward the ridge side of the roof. Then, the fastening strip 79 provided on the base member 62 of the module 61 comes into engagement with the engaging part 84 of the fastening strip 81. That is, the fastening strip 79 of the base member 62 is interposed between the tiles 93 and the engaging part 84 of fastening strip 81. In this condition, the fastening screw 88 is driven into the roof panel 90 through the ridge-side edge of the base member 62 and the support member 92.

After the solar cell module 61 is thus laid at the upper edges of the tiles 93, another solar cell module 61 may be laid at the ridge-side edge of the lower solar cell module 61. First, the upper solar cell module 61 is positioned, with its eaves-side edge overlapping the ridge-side edge of the lower solar cell module 61. Next, the upper solar cell module 61 is slid toward the eaves side of the roof. Then, the fastening strip 79 provided on the base member 62 of the upper module 61 comes into engagement with the holding strips 80 that are secured to the ridge-side edge of the base member 62 of the lower module 61.

Thus, the fastening strip 79 formed integral with the eaves-side surface 66 of the base member 62 of the lower solar cell module 61 is held at the ridge-side edges of the tiles 93, and the fastening strip 79 of the upper solar cell module 61 is held at the junction with the lower module 61. Hence, either solar cell module 61 can be prevented from blown off even if it is exposed to a strong wind.

FIGS. 24A and 24B are plan views, each illustrating a relation that the solar cell module 61 and the tiles 93 may have. More correctly, FIG. 24A shows the relation of A=3×a, where A is the effective width of each solar cell module 61, measured in the direction at right angles to the gradient of the roof, and a is the effective width of the tile 93, measured in the direction at right angles to the gradient of the roof. In other words, the width of the solar cell module 61 is three times as large as the width of the tile 93. FIG. 24B depicts the relation of A=4×a. That is, the width of the solar cell module 61 is four times as large as the width of the tile 93.

In either case, the number of fastening strips 81 used and the positions thereof depend on the width of the solar cell module 61 (i.e., width measured in the direction at right angle to the gradient of the roof). If the solar cell module 61 has a width n times as much as the width of the tiles 93, about (n−1) fastening strips 81 will be used, and the through hole 93R or 93L of each tile 93 is selected so that the fastening strips 81 may be arranged at almost regular intervals in the widthwise direction of the solar cell module 1.

The case shown in FIG. 24A will be explained first. The cell module 61 is staggered or displaced by half the width of the tiles 93. First, tiles 93 are laid on the eaves-side edge of the roof, thus forming a row. Then, the first solar cell module 61 is laid, overlapping the ridge-side edges of four tiles 93.

These four tiles 93 are designated at 93a, 93b, 93c and 93d, the tile 93a being the rightmost one. In this case, the through holes 93L of the tiles 93a and 93c are selected, fixing the fastening strips 81 that prevent the solar cell module 61 from being blown off.

As shown in FIG. 24A, another solar cell module 61 is laid, overlapping the upper edge of the first solar cell module 61. The upper solar cell module 61 is displaced to the right with respect to the first solar cell module 61, by half the width of the tiles 93.

Then, the upper solar cell module 61 overlaps the upper surface of the tile 93x that lie adjacent to the lower solar cell module 61. Therefore, if the through hole 93L of the tile 93x is selected, thus fixing the fastening strips 81, the right side of the upper solar cell module 61 can be set in engagement with the fastening strips 81 which prevent the module 61 from being blown off.

FIG. 24A shows the case where another solar cell module 61 is laid at the upper edge of the solar cell module 61. The upper solar cell module 61 is displaced to the right by half the width of the tiles 93. The upper solar cell module 61 overlaps the tile 93x that is laid at one side of the lower solar cell module 61. Therefore, the through hole 93L is selected, whereby the fastening strips 81 are fixed. As a result, the right-side edge of the upper solar cell module 61 can be engaged with fastening strips 81, which prevent the solar cell module from being blow off.

The case shown in FIG. 24B will now be explained. The cell module 61 is staggered or displaced by half the width of the tiles 93. First, tiles 93 are laid on the eaves-side edge of the roof, thus forming a row. Then, the first solar cell module 61 is laid, overlapping the ridge-side edges of five tiles 93.

These five tiles 93 are designated at 93*a*, 93*b*, 93*c*, 93*d* and 93*e*, the tile 93*a* being the rightmost one. In this case, the through holes 93L of the tiles 93*a* and 93*d* and the through hole 93R of the tile 93*c* are selected, thereby fixing the fastening strips 81 that prevent the solar cell module 61 from being blown off.

As FIG. 24B shows, another solar cell module 61 is laid, overlapping the upper edge of the first solar cell module 61. The upper solar cell module 61 is displaced to the right with respect to the first solar cell module 61, by half the width of the tiles 93. Then, the upper solar cell module 61 overlaps the upper surfaces of the tile 93*x* that lie adjacent to the lower solar cell module 61. Therefore, if the through hole 93L of the tile 93*x* is selected, thus fixing the fastening strips 81, the right side of the upper solar cell module 61 can be set in engagement with the fastening strips 81 which prevent the module 61 from being blown off.

As illustrated in FIGS. 24A and 24B, the through holes 93R and 93L of the tiles 93 are selected, fixing the fastening strips 81 are fixed at the regular intervals so that the strips 81 may be arranged at regular intervals. The fastening strips 81 can therefore fasten the solar cell module 61 to the tiles 93. Thus, they prevent the solar cell module 61 from being blown off even if the module 61 is exposed to a strong wind.

In the embodiment described above, the effective width A of the solar cell module 61 may be three times as large as the width of the tiles 93 in one case and four times as large as the width of the tiles 93 in the other case. Nevertheless, the present invention is not limited to the effective width of the solar cell module 61.

Hence, the fastening strips for preventing the module from being blown off fasten the eaves-side edge of the solar cell module to the ridge-side edges of the tiles when the solar cell module is laid together with the tiles. The fastening strips therefore prevent the solar cell module from being blown off even if the module is exposed to a strong wind. This makes the solar cell module more resistant to rainstorms and negative pressures.

The fastening strips for preventing the module from being blown off fasten not only the solar cell module to the roof but also the tiles, to the roof panel. In addition, the fastening strips can be adjusted in terms of position and height. They can, therefore, be used to secure various types of tiles that differ in surface shape.

Figure 25:
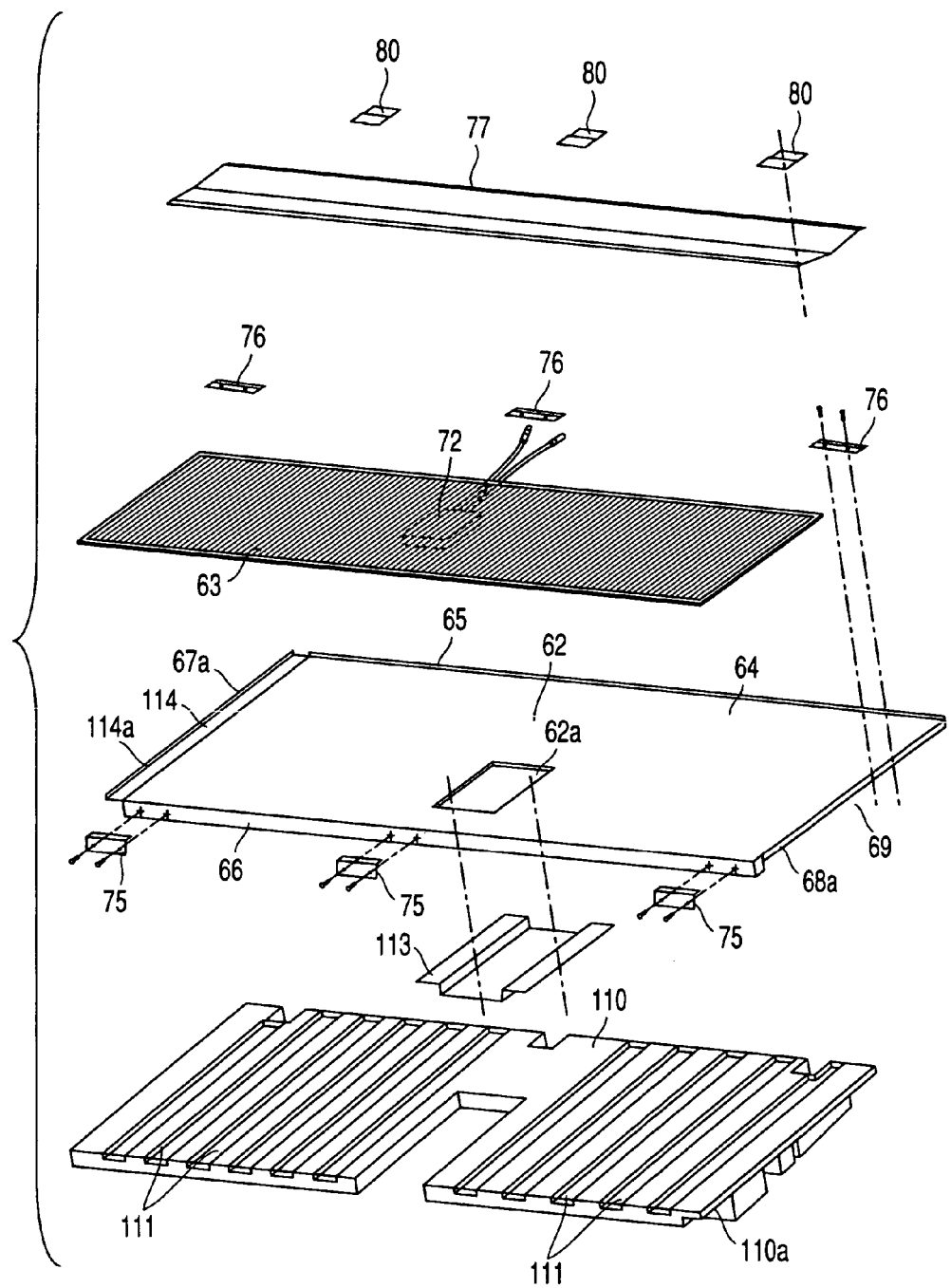
FIG. 25 is an exploded perspective view of a solar cell module according to a tenth embodiment of the invention.
Figure 26:
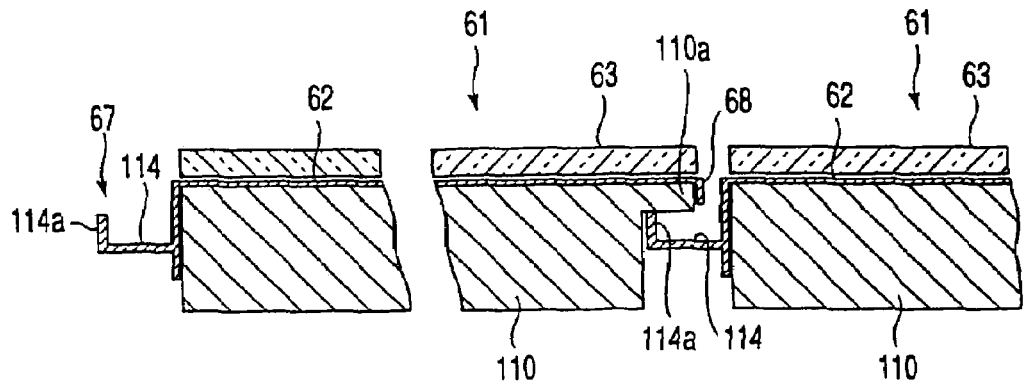
FIG. 26 is a sectional view showing the tenth embodiment, or a junction between two solar cell modules that are laid side by side.
Figure 27:
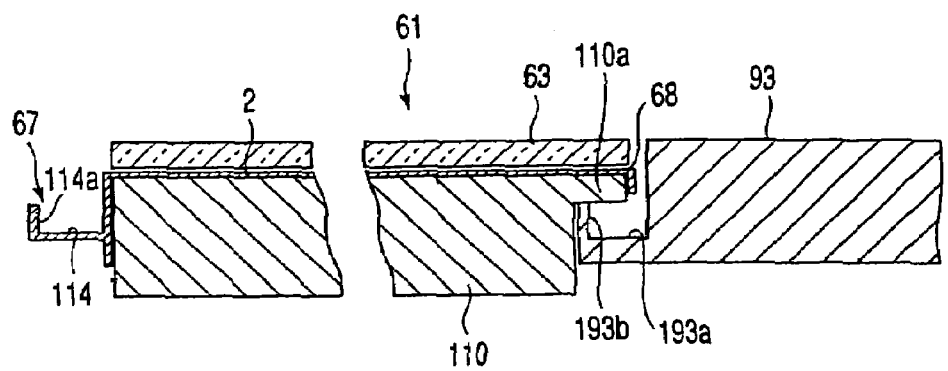
FIG. 27 is a sectional view depicting the tenth embodiment, or showing how each solar cell module overlaps the adjacent tiles.
Figure 28:
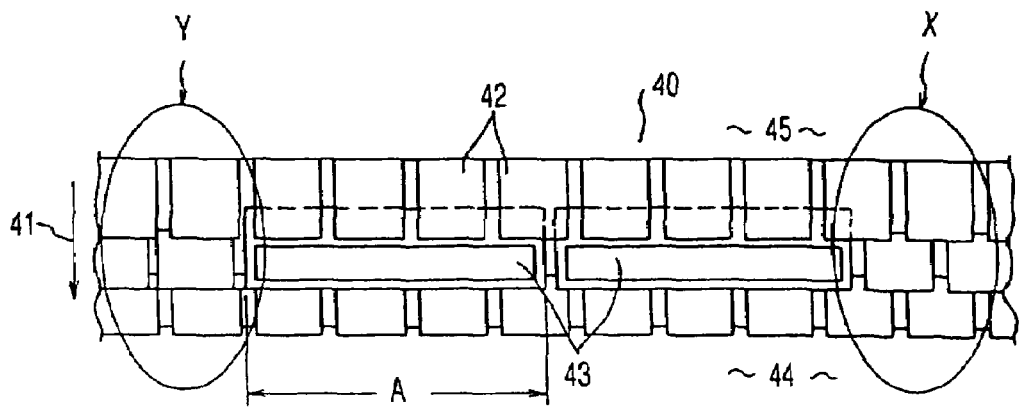
FIG. 28 shows a comparative example, depicting solar cell modules and roof tiles, which are laid on the roof together.

FIGS. 25 to 27 show the tenth embodiment. The components identical to those of the ninth embodiment are designated at the same reference numerals and will not be described. FIG. 25 is an exploded perspective view of a solar cell module. FIG. 26 is a sectional view showing a junction between two solar cell modules that are laid side by side in the transverse direction. FIG. 27 is a sectional view showing how each solar cell module overlaps the adjacent tiles.

The solar cell module 1 will be described, with reference to FIG. 25. The base member 62 has an upper surface 64, a ridge-side surface 65 and an eaves-side surface 66. It has an under-lapping part 67*a* at one end. The base member 62 is a rectangular flat box, or a so-called bottomless box that opens at the roof-side surface 69. The base member 62 has almost the same height as the ordinary tiles. An insulating support member 110 is provided on the lower surface of the base member 62.

The insulating support member 110 prevents the base member 62 from being deformed when the base member receives the weight of the worker who is laying roof tiles. The insulating support member 110 may be made of foamed material of polymer such as styrene, ethylene, urethane or the like, copolymer containing mainly the polymer or a mixture of polymer and copolymer.

A plurality of drainage grooves 111 are made in the upper surface of the insulating support member 110, on which the solar cell 63 is mounted. The drainage grooves 111 extend from the ridge-side surface 65 to eaves-side surface 66 of the base member 62. The insulating support member 110 is bonded to the lower surface of the base member 62.

The solar cell 63 that is shaped like a rectangular panel is mounted on the upper surface 64, close to the eaves-side surface 66. The solar-cell holding region of the upper surface 64 of the base member 62 has an opening in almost the center part. The solar cell 63 has a terminal box 72, which is inserted and fixed in the opening. A terminal-box cover 113 covers the terminal box 72.

A trough section 114 is formed with the under-lapping part 67*a* of the base member 62. The trough section 114 has a rising wall 114*a* and an L-shaped cross section. The trough section 114 extends from the ridge-side surface 65 to the eaves-side surface 66. It guides rainwater and the like from the ridge-side surface 65 to the eaves-side surface 66.

The base member 62 has an overlapping part 68*a*, which has almost the same width as the under-lapping part 67*a*. The overlapping part 68*a* overlaps and opposes the under-lapping part 67*a* when another solar cell module 61 is laid beside the solar cell modules 61. Below the overlapping part 68*a* there is provided a projecting part 110*a*, which is formed integral with the insulating support member 110.

The projecting part 110*a* need not extend over the entire width of the overlapping part 68*a*. Rather, its width may be half the width of the overlapping part 68*a*. When the overlapping part 68*a* lies on the under-lapping part 67*a*, its lower surface contacts the upper edge of the rising wall 114*a* of the trough section 114 that is formed integral with the under-lapping part 67*a*.

When the solar cell module 61 is laid beside a tile 93, the overlapping part 68*a* of the base member 62 lies on the trough section 93*a* of this tile 93. The lower surface of the projecting part 110 contacts the upper edge of the rising wall 93*a* of the trough section 93*a*. Thus, a waterproof structure is provided.

The tiles and the solar cell modules are laid together in the same way as in the ninth embodiment. The solar cell modules 61 are laid at the upper edges (at the eaves side 90*b*) of the tiles 93 that have been laid in the transverse direction. The solar cell modules 61 may be laid side by side, or in the transverse direction. If this is the case, the overlapping part 68*a* of the base member 62 of one solar cell module 61 overlaps and opposes the under-lapping part 67*a* of the base member 62 of the other solar cell module 61. Moreover, the lower surface of the projecting part 110 contacts the upper edge of the rising wall 114*a* of the trough section 114 that is formed integral with the under-lapping part 67*a*. This is because the projecting part 110*a*, which is formed integral with the insulating support member 110, lies below the overlapping part 68*a*.

The projecting part 110*a* is made of foamed synthetic resin. Thus, the rising wall 114*a* bites into the projecting part 110*a* due to the weight of the solar cell module 61 when the projecting part 110*a* contacts the upper edge of the rising wall 114*a*. This achieves reliable sealing, without the necessity of using caulking material. No water leakage will occur at the junction between the solar cell modules 61 even if rainwater splashes in the trough section 114 as a gusty wind blows it into the trough section 114. The trough section 114 will guide the rainwater to the eaves side of the roof.

Any solar cell module 61 may be laid beside a tile 93. In this case, the overlapping part 68*a* of the base member 62 of the solar cell module 61 overlaps and opposes the trough section 113a of the tile 93. Furthermore, the projecting part 110a formed integral with the insulating support member 110 lies below the overlapping part 68a. Therefore, the lower surface of the projecting part 110a contacts the upper edge of the rising wall 193b that defines the trough section 193a of the tile 93.

Since the projecting part 110a is made of foamed synthetic resin, the rising wall 114a bites into the projecting part 110a due to the weight of the solar cell module 61 when the projecting part 110a contacts the upper edge of the rising wall 193b of the trough section 193a. This achieves reliable sealing, without the necessity of using a caulking member. No water leakage will occur at the junction between the solar cell modules 61 and the tile 93 even if rainwater splashes in the trough section 193a as a gusty wind blows it into the trough section 193a. The trough section 193a will guides the rainwater to the eaves side of the roof.

To fasten the solar cell 63 to the base member 62 of the solar cell module 16, fastening strips are secured to the base member 62, usually by using screws, bolts and nuts, or rivets. Hence, rainwater may leak through the junction between any fastening strip and the base member 62. The rainwater may then flow onto the upper surface of the insulating support member 110. Nevertheless, the rainwater is reliably guided to the eaves side of the roof. This is because drainage grooves 111 are made in the upper surface of the insulating support member 110 and extend from the ridge-side surface 65 to eaves-side surface 66 of the base member 62. Thus, it is unnecessary to provide a waterproof structure at the junction between each fastening strip and the base member 62, by using a caulking member, waterproof seal packing or the like. This serves to reduce the number of components of the solar cell module and the number of steps for assembling the solar cell module.

In this embodiment, the base member of each solar cell module has an overlapping part that overlaps the trough section of the tile or other solar cell module that is laid adjacent to the solar cell module. The insulating support member provided on the lower surface of the base member has a projecting part lies on the trough section of the adjacent tile or solar cell module. The projecting part renders waterproof the junction between the solar cell modules or between the solar cell module and the tile. A reliable waterproof structure can be attained without filling a caulking member in the junction.

Moreover, the drainage grooves are made in the surface of the insulating support member, each extending from the ridge side to eaves side of the insulating support member. The drainage grooves guide water to the eaves side of the roof, even if water leaks at the junction between the solar cell and the base member.

Thus, the manufacturing cost of the solar cell modules can be lowered, the solar cell modules can be easily laid together with tiles, and the time required for laying the modules and tiles can be shortened.

As described above, the present invention uses waterproof members, successfully eliminating the displacement of tiles even if the tiles are laid together with solar cell modules, in a transverse row. The tiles of ordinary type and the solar cell modules can achieve design harmony, though they are laid together. In addition, the junctions between the tiles and the junction between any solar cell module and the adjacent tile can be waterproof.

As has been described, the present invention makes it possible to secure solar cell modules easily and firmly to the roof when the modules are laid together with tiles. Further, the invention can provide solar cell modules that are greatly resistant to rainstorms and negative pressures. The invention is, therefore, useful in the field of solar cell modules and the field of laying solar cell modules together with roof tiles.

What is claimed is:

1. A method of laying solar cell modules together with tiles on the roof of a building, comprising:
   laying a separate waterproof member having approximately the same height and length as the tiles and a width narrower than that of the tiles between each solar cell module and one tile which are laid adjacent in a direction perpendicular to the direction of a gradient of the root said separate waterproof member comprises a rectangular box that opens at a lower portion thereof with respect to the roof,
   wherein the separate waterproof member has a trough section on one side, said trough section draining rainwater through a junction between each solar cell module and the one tile, which are laid adjacent in the direction perpendicular to the direction of the gradient of the roof, and gaps between said separate waterproof member, a side end portion of each solar cell module and the one tile are sealed in a watertight manner by seal members.

2. A method of laying solar cell modules together with tiles on a roof panel, comprising:
   causing a lower surface of an eaves-side of said solar cell module to overlap an upper surface of a ridge-side of said tile laid on the roof;
   fixing fastening strips, which prevent said solar cell module from being blown off, to the upper portion of the ridge-side of said tile, the fastening strips including engagement members; and
   engaging the engagement members of the fastening strips to the lower portion of the eaves-side of said solar cell module, wherein the fastening strips each include a screw secured to the roof through a ridge-side end of one tile at one end portion of said each fastening strip, and an engaging part coupled to an eaves-side end of the solar cell module laid at the upper edges of the tiles at another end portion of said each fastening strip, the engaging part coupling the lower portion of eaves-side of the solar cell module and the upper edge of the ridge-side of the tiles.

3. The method of laying solar cell modules, according to claim 2, wherein the fastening strips each allow a height-adjusting screw, which has a tip abutting on an upper surface of a tile, to be screwed into said each fastening strip, and can adjust a height of the engaging part coupled to the eaves-side end of the solar cell module laid at the upper edges of the tiles, the height of the engaging part varying in accordance with an amount by which the height-adjusting screw is screwed into said each fastening strip.

4. A method of laying solar cell modules together with tiles on a roof panel, comprising:
   causing a lower surface of an eaves-side of said solar cell module to overlap an upper surface of a ridge-side of said tile laid on the roof;
   fixing fastening strips, which prevent said solar cell module from being blown off, to the upper portion of the ridge-side of said tile, the fastening strips including engagement members; and
   engaging the engagement members of the fastening strips to the lower portion of the eaves-side of said solar cell module, wherein the solar cell module has an effective width which is an integral multiple of the width of the tiles, and when the solar cell module and the tiles are arranged in a zigzag manner, the fastening strips are arranged at substantially regular intervals in a widthwise direction of the solar cell module, and engage the lower portion of the ridge side of the solar cell module and the upper portion of the eaves sides of the tiles with each other.

5. An apparatus for preventing a solar cell module from being blown off, the solar cell module being laid together with tiles on a roof panel, and fastening strips provided on the ridge-side of the tile, wherein:

said fastening strips which prevent a solar cell module from being blown off have a securing part directly secured to the roof through a ridge-side end of one tile, and an engaging part coupled to an eaves-side end of the solar cell module laid at the upper edges of the tiles, the engaging part coupling the lower portion of eaves-side of the solar cell module and the upper edge of the ridge-side of the tile, wherein each fastening strip comprises a rectangular main part and two rising parts that extend from the main part from two sides of the main part.

* * * * *